(12) United States Patent
Qin et al.

(10) Patent No.: US 10,797,333 B2
(45) Date of Patent: Oct. 6, 2020

(54) PREPARATION METHOD FOR ALKALINE ANION EXCHANGE MEMBRANE AND USE THEREOF IN FUEL CELL

(71) Applicant: HANGZHOU DIANZI UNIVERSITY, Hangzhou (CN)

(72) Inventors: Haiying Qin, Hangzhou (CN); Cai Zhu, Hangzhou (CN); Yongping Hu, Hangzhou (CN); Kaijian Chen, Hangzhou (CN); Jiabin Liu, Hangzhou (CN); Zhe Kong, Hangzhou (CN); Hongbo Wang, Hangzhou (CN); Yan He, Hangzhou (CN); Zhenguo Ji, Hangzhou (CN)

(73) Assignee: HANGZHOU DIANZI UNIVERSITY, Hangzhou (CN)

( * ) Notice: Subject to any disclaimer, the term of this patent is extended or adjusted under 35 U.S.C. 154(b) by 248 days.

(21) Appl. No.: 16/066,052

(22) PCT Filed: Nov. 22, 2016

(86) PCT No.: PCT/CN2016/106788
§ 371 (c)(1),
(2) Date: Jun. 25, 2018

(87) PCT Pub. No.: WO2017/088732
PCT Pub. Date: Jun. 1, 2017

(65) Prior Publication Data
US 2020/0099078 A1    Mar. 26, 2020

(30) Foreign Application Priority Data

Nov. 26, 2015 (CN) .......................... 2015 1 0833951

(51) Int. Cl.
| | |
|---|---|
| *H01M 8/10* | (2016.01) |
| *H01M 4/86* | (2006.01) |
| *H01M 4/88* | (2006.01) |
| *H01M 4/90* | (2006.01) |
| *H01M 8/1044* | (2016.01) |
| *H01M 8/1051* | (2016.01) |
| *H01M 8/1072* | (2016.01) |
| *H01M 8/1018* | (2016.01) |

(52) U.S. Cl.
CPC ....... *H01M 8/1044* (2013.01); *H01M 4/8652* (2013.01); *H01M 4/881* (2013.01); *H01M 4/8857* (2013.01); *H01M 4/9016* (2013.01); *H01M 8/1051* (2013.01); *H01M 8/1074* (2013.01); *H01M 2008/1095* (2013.01)

(58) Field of Classification Search
CPC ............. H01M 8/1044; H01M 8/1051; H01M 8/1074; H01M 4/9016; H01M 4/8857; H01M 4/881; H01M 4/8652; H01M 2208/1095
USPC ......................................................... 521/27
See application file for complete search history.

(56) References Cited

U.S. PATENT DOCUMENTS

| | | | | |
|---|---|---|---|---|
| 2012/0015281 | A1* | 1/2012 | Sakamoto | ........... H01M 4/9041 429/482 |
| 2013/0236809 | A1* | 9/2013 | Haan | ................... H01M 8/1009 429/482 |

FOREIGN PATENT DOCUMENTS

| | | | | |
|---|---|---|---|---|
| CN | 102362382 | A | 2/2012 | |
| CN | 103804631 | A | 5/2014 | |
| CN | 104311857 | A | 1/2015 | |
| CN | 104371128 | A * | 2/2015 | |
| CN | 104371128 | A | 2/2015 | |
| CN | 105680055 | A * | 6/2016 | .......... H01M 4/9041 |
| CN | 105680055 | A | 6/2016 | |

OTHER PUBLICATIONS

International Search Report from PCT/CN2016/106788 dated Feb. 4, 2017.
Written Opinion from PCT/CN2016/106788 dated Feb. 4, 2017.

* cited by examiner

*Primary Examiner* — Michael Bernshteyn

(57) ABSTRACT

The present invention discloses a preparation method of an alkaline anion exchange membrane and a use of the membrane in a fuel cell. The preparation method of the alkaline anion exchange membrane contains: taking polyvinyl alcohol as a substrate, which provides mechanical strength for the membrane; taking a commercialized alkaline resin as an anion exchange resin of chemically reactive groups, performing a cross-linking reaction between polyvinyl alcohol and the alkaline resin by mixing; meanwhile, during the process of forming the alkaline anion exchange membrane, adding an organic salt of transition metal, and doping transition metal ions into the membrane. By taking advantages of catalytic characteristics of the transition metal ions, the fuel leaking from the anode of the cell can perform a catalytic reaction in time in the ion exchange membrane, and thereby improve an ion conductivity of the membrane and efficiently decrease a resistance of the cell. The fuel cell assembled by the anion exchange membrane prepared in the present invention shows an excellent power-generating property.

8 Claims, 5 Drawing Sheets

PREPARATION METHOD FOR ALKALINE ANION EXCHANGE MEMBRANE AND USE THEREOF IN FUEL CELL

RELATED APPLICATIONS

This application is a 35 U.S.C. § 371 national phase application of PCT/CN2016/106788 (WO 2017/088732), filed on Nov. 22, 2016 entitled "Preparation Method for Alkaline Anion Exchange Membrane and Use Thereof in Fuel Cell", which application claims the benefit of Chinese Application Serial No. 201510833951.1, filed Nov. 26, 2015, which is incorporated herein by reference in its entirety.

TECHNICAL FIELD

The present invention refers to the field of fuel cell, specifically refers to an alkaline anion exchange membrane in a polymer electrolyte membrane fuel cell and the preparation method thereof.

BACKGROUND

The fuel cell, as a special device converting the chemical energy into the electric energy, has a plurality of inimitable advantages comparing with other energy generating devices, such as high energy conversion efficiency, low pollution, wide selection range for energy storage materials, low noise and so on, and being taken as one of the most hopeful and environment-friendly chemical power source. In particular, a polymer electrolyte membrane fuel cell has attracted growing attentions and has recently become a research hot spot, for it efficiently comes over problems, such as fuel leaking and so on, and for it has advantages such as being capable of quick start and quick response to a change in load and so on.

The polymer electrolyte membrane fuel cell takes a polymer electrolyte membrane as a solid electrolyte, having the function of dividing the cathode and the anode and conducting protons ($H^+$) or hydroxyl ion ($OH^-$), being a critical component in the polymer electrolyte membrane fuel cell. Therefore, the research and development of a high-property polymer electrolyte membrane is particularly important.

According to the differences of conducting ions, the polymer electrolyte membrane fuel cell can generally be divided into an acidic polymer electrolyte membrane fuel cell that uses a proton exchange membrane and an alkaline polymer electrolyte membrane fuel cell that uses an alkaline anion exchange membrane. At present, the commercialized proton exchange membrane, such as Nafion membrane produced by DuPont USA, is the most widely used polymer electrolyte membrane in fuel cell, because it has a high conductivity, a good chemical stability, a good electrochemical stability and a good mechanical stability. However, Nafion membrane has problems such as a complicated preparation process, a high price, the preparation process being not environment-friendly, being instable under the high temperature and so on. While on the other side, comparing with a proton exchange membrane fuel cell, an alkaline anion exchange membrane fuel cell has a series of advantages: for its alkaline environment, the fuel cell has a faster reaction kinetic, a low fuel leaking rate, and it can use a non-precious metal catalyst and an organic fuel which is easy to be transported, such as methanol, ethanol and the like. Because of these advantages, the alkaline anion exchange membrane fuel cell becomes a fuel cell technology that attracts attentions of scholars of various countries, and the alkaline anion exchange membrane naturally becomes a research hot spot.

At present, there are various reports of the alkaline anion exchange membrane, wherein the report of the alkaline anion membrane which takes a quaternium group and a phosphonium group as active groups has the largest amount, and particularly the report of the quaternium group attracts more attentions. Such as in a Chinses patent with the publish number of CN104311857A, monomer containing the quaternium group performs a nucleophilic substitution reaction to the main polymer chain, obtaining a kind of alkaline anion exchange membrane with double quaternium groups and long side chains; in a Chinses patent with a publish number of CN103804631A, alkaline anion exchange membrane with a side chain quaternized polyketide and the preparation method thereof are disclosed. But in the alkaline anion membrane exchange membrane, the preparation of a quaternium type polymer generally goes through many complicated steps from a chloromethylation, a quaternization to an alkalization and the like. While for the method of radiation grafting the quaternium group on a polymer substrate and the like, there exist problems such as a complicated preparation processing, a high cost of materials and so on. Comparing with the proton exchange membrane fuel cell, the alkaline anion exchange membrane fuel cell also has the problem of low conductivity, which directly decreases a power-generating property of the fuel cell and hasn't been solved by the research above. Therefore, researching an alkaline anion exchange membrane, which has a good ionic conductivity, a good fuel power-generating property, a simple preparation processing and a low cost, has a great significance for the development of the polymer electrolyte membrane fuel cell.

SUMMARY OF THE INVENTION

Aiming at the technical problems of an alkaline anion exchange membrane in the prior art, an object of the present invention is to provide an alkaline anion exchange membrane with a simple preparation process, a low cost, a good ion conductivity and a good power-generating property of fuel cell, and a preparation method thereof.

In order to achieve the object of the present invention, a technical solution used in the present invention is: the present invention provides a preparation method of the alkaline anion exchange membrane, which contains the steps below:

1) firstly, adding a transition metal inorganic salt into deionized water, stirring, to obtain an aqueous solution of the transition metal inorganic salt;
2) dissolving an polyvinyl alcohol powder into the aqueous solution of transition metal inorganic salt which is obtained in the step 1), heating and stirring, to obtain a first gel;
3) grinding an AER alkaline resin into fine powders, adding the fine powders into the first gel, after cross-linking reacting between the fine powders and the first gel, forming a second gel;
4) film-forming the second gel on a substrate, drying; and
5) alkalization pretreating the dried film.

Preferably, the transition metal inorganic salt is selected from a group consisting of an inorganic salt of transition metal Co, an inorganic salt of transition metal Fe and an inorganic salt of transition metal of transition metal Ni.

Further preferably, the transition metal inorganic salt is a divalent cobalt salt. More preferably, the divalent cobalt salt is cobalt dioxide or $COSO_4$.

Further, step 1) the addition amount of the transition metal inorganic salt is determined according to the content of transition metal ions, and the content of the transition metal ions is 0.1%-1%. The content of the transition metal ions is a mass percentage of the transition metal ions to polyvinyl alcohol.

Further, heating temperature in step 2) is controlled to be between 80 and 90 degrees centigrade, stirring for 2.5-3 h.

Further, a mass ratio of the AER alkaline resin added in step 3) to the polyvinyl alcohol powders added in step 2) is 1:2.

Further, the alkalization pretreatment is: immersing the film formed in step 4) into a solution of 1M KOH for 12-24 h, taking the film out and repeatedly washing the film with deionized water.

The present invention provides the alkaline anion exchange membrane prepared by the preparation method above. The present invention also provides a use of the alkaline anion exchange membrane prepared, which is a use of the alkaline anion exchange membrane in the fuel cell.

The beneficial effects of the present invention:

the present invention takes advantages of catalytic characteristics owned by the transition metal ions, adding the transition metal ions into an ion exchange membrane, making the fuel that leaks from the cell anode be able to perform a catalyst reaction in time in the ion exchange membrane, thereby increasing an ion conductivity rate of the membrane, and efficiently decreasing the resistivity of the fuel cell. An impedance of an alkaline anion exchange membrane doped with the transition metal ions is obviously lower than a membrane non-doped with the transition metal ions. Finally, the power-generating property is improved. Under 60° C., the maximum output power density of the exchange membrane of the present invention is 242 mW·cm$^{-2}$, the power-generating property is obviously better than the membrane non-doped with transition metal ions and the proton exchange membrane N117, which is commercial available.

In addition, the preparation method of the present invention has a simple preparation processing, being suitable in scaled industrial production.

DETAILED DESCRIPTION OF THE PREFERRED EMBODIMENT

Figure 1:
FIG. 1 is a SEM image of an alkaline anion exchange membrane doped with Co ions prepared in embodiment 1.

Here is a conception of preparing the alkaline anion exchange membrane of the present invention below: taking polyvinyl alcohol (PVA) as a substrate, which provided mechanical strength for the membrane; taking IRA-402 (OH) alkaline resin of Amberlite series produced by Alfa Aesar Company of USA (which is called AER alkaline resin for short hereinafter) as an anion exchange resin of chemically reactive groups, performing a cross-linking reaction between polyvinyl alcohol and AER alkaline resin; meanwhile, in the process of forming an alkaline anion exchange membrane, adding an inorganic salt of a transition metal, and doping transition metal ions in the membrane.

PVA was taken as the substrate in the present invention, because PVA had a good film-forming property, a good mechanical property, an excellent chemical property and a good alcohol-rejecting property. The key of the present invention was that the transition metal ions were doped in the membrane. A mixed potential produced by the problem of fuel leaking would directly lead to decreased properties of cell. Although a fuel leaking rate of the alkaline anion exchange membrane fuel cell was relatively lower than a proton exchange membrane fuel cell to some extent, in fact, the problem can't be avoided and still was a technical problem of the alkaline anion exchange membrane fuel cell. Catalytic characteristics owned by the transition metals were considered by the applicant of the present invention. By using the catalytic characteristics, which was advantageous for solving the problem that the anode fuel leaked from the ion exchange membrane, the ion conductivity rate of the ion exchange membrane was ensured, a resistivity of the cell was decreased, and thereby an object of improving a power-generating property of the cell was achieved.

Specifically, the preparation process of the alkaline anion exchange membrane of the present invention was as followed:

1) firstly, a transition metal inorganic salt was added into deionized water and was stirred under a room temperature, and an aqueous solution of the transition metal inorganic salt was obtained. In particular, the transition metal inorganic salt was preferably selected from an inorganic salt of transition metal Co, an inorganic salt of transition metal Fe, and an inorganic salt of transition metal Ni, and further preferably selected from divalent cobalt salt, specifically, such as cobalt dioxide, $CoSO_4$ and the like.

2) a polyvinyl alcohol powder was dissolved into the aqueous solution of the transition metal inorganic salt which was obtained in the step 1), the aqueous solution was heated and stirred, and a PVA gel doped with the transition metal ions was obtained. Specifically, the aqueous solution was heated to 80-95 degrees centigrade and was stirred for 2.5-3 h to make the transition metal ions be fully doped into an organic molecular chain.

3) an AER alkaline resin was grinded into fine powders, the fine powders were added into the PVA gel doped with the transition metal ions which was prepared in step 2), after the cross-linking reaction between fine powders and the PVA gel, a final PVA-AER gel doped with transition metal ions was formed.

4) the gel prepared from step 3) was scraped on the substrate by using a membrane scraper, or the gel prepared from step 3) was flow-casted into a film on the substrate; the film was dried. During the time of film-forming, a thickness of the film was preferably 100-2000 μm; in addition, specifically, the way of drying was natural drying.

5) the dried film was alkalization pretreated. Specifically, the film was immersed in an aqueous solution of 1M KOH for 12-24 h, and then the film was taken out and was repeatedly washed with deionized water to remove the KOH adsorbed on the surface of the film.

The present invention is described in further details below by specific embodiments.

Embodiment 1

The process of preparing the alkaline anion exchange membrane of embodiment 1 is:

1) 0.08 g cobalt dioxide (the content of the transition metal ions was 0.4%, i.e. the mass percentage of the transition metal ions to the polyvinyl alcohol was 0.4%) was added into deionized water and was stirred for 5 min to obtain an aqueous solution containing divalent cobalt ions;

2) 5 g PVA powders was solved in the aqueous solution of divalent cobalt ions, the aqueous solution was heated to 80-95 degrees centigrade and was stirred for 2.5-3 h to obtain a PVA gel doped with divalent cobalt ions;

3) 2.5 g AER alkaline resin was taken and grinded into fine powders, and was added into the PVA gel doped with divalent cobalt ions, after the cross-linking reaction between the fine powders and the PVA gel doped with divalent cobalt ions, a PVA-AER gel doped with transition metal Co ions was formed;

4) the PVA-AER gel was scraped on a glass substrate, and the thickness of the film was set as 1000 μm, and the film was naturally dried;

5) the dried film was immersed in a solution of 1M KOH for 12-24 h, and then the film was taken out and was repeatedly washed with deionized water.

Embodiment 2

The difference of the process of preparing the alkaline anion exchange membrane between embodiment 2 and embodiment 1 was that: the transition metal salt being doped was $CoSO_4$, and the content of the transition metal ions was 0.6%.

Embodiment 3

The difference of the process of preparing the alkaline anion exchange membrane between embodiment 3 and embodiment 1 was that: the amount of the transition metal salt, which was cobalt dioxide, was different. In step 1) of embodiment 3, the amount of the cobalt dioxide was 0.02 g, i.e. the content of the transition metal ions was 0.1%; in step 4), the thickness of the film was set as 500 μm while scraping the film.

Embodiment 4

The difference of the process of preparing the alkaline anion exchange membrane between embodiment 4 and embodiment 1 was that: in step 1), the amount of cobalt dioxide was 0.20 g, i.e. the content of the transition metal ions was 1.0%; in step 4), the thickness of the film was set as 800 μm while scraping the film.

Comparative Embodiment 1

Comparing with embodiment 1, the transition metal ions weren't doped in the alkaline anion exchange membrane which was prepared in comparative embodiment 1. The specific process was as below: 5 g PVA powders were added into 30 mL deionized water, the solution was heated to 80-95 degrees centigrade and was stirred for 2.5-3 h to obtain a PVA gel; 2.5 g AER alkaline resin was taken and grinded into fine powders, the fine powders were added into the PVA gel, the AER alkaline resin and the PVA gel reacted with each other to obtain an AER-PVA gel; the AER-PVA gel was scraped on the glass substrate, and the thickness of the film was set as 1000 μm, the film was naturally dried; the dried film was taken out and was immersed in a solution of 1M KOH for 12-24 h, and the film was repeatedly washed with deionized water. The alkaline anion exchange membrane of comparative embodiment 1 was prepared.

Comparative Embodiment 2

A proton exchange membrane N117 produced by DuPont USA, which was brought from the market, was used in comparative embodiment 2.

Performance Tests:

I) Swelling Rate Test:

The dried film was cut into a size of length 4.5 cm×width 3 cm, a film sample was immersed in deionized water for 24 h, and the film sample was taken out for measuring a length and a width respectively, and a swelling rate in the direction of length and the swelling rate in the direction of width were counted. The data of each embodiment were shown in table 1:

TABLE 1 the data of the swelling rate of the alkaline anion exchange membranes prepared in each embodiment:

| | Embodiment 1 | Embodiment 2 | Embodiment 3 | Embodiment 4 | Comparative Embodiment 1 |
|---|---|---|---|---|---|
| direction of length | 17.7% | 17.7% | 16.6% | 17.1% | 17.7% |

TABLE 1-continued the data of the swelling rate of the alkaline anion exchange membranes prepared in each embodiment:

| | Embodiment 1 | Embodiment 2 | Embodiment 3 | Embodiment 4 | Comparative Embodiment 1 |
|---|---|---|---|---|---|
| direction of width | 16.7% | 16.7% | 15.5% | 15.9% | 16.7% |

II) Water Absorption Rate Test

The film was dried under 60 degrees centigrade, and was weighed; and then the film was immersed in deionized water for 24 h, and was weighed the water absorption rate was counted. The data of each embodiment were shown in table 2:

TABLE 2 the data of water absorption rate of the alkaline anion exchange membranes prepared in each embodiment:

| | Embodiment 1 | Embodiment 2 | Embodiment 3 | Embodiment 4 | Comparative Embodiment 1 |
|---|---|---|---|---|---|
| Water absorption | 127.2% | 125.3% | 122.2% | 126.8% | 121.5% |

It can be seen from the water absorption rate that there was no obvious differences between embodiments and comparative embodiment. Transition metal doping didn't generate obvious influence on the water absorption property.

III) SEM Test

Figure 2:
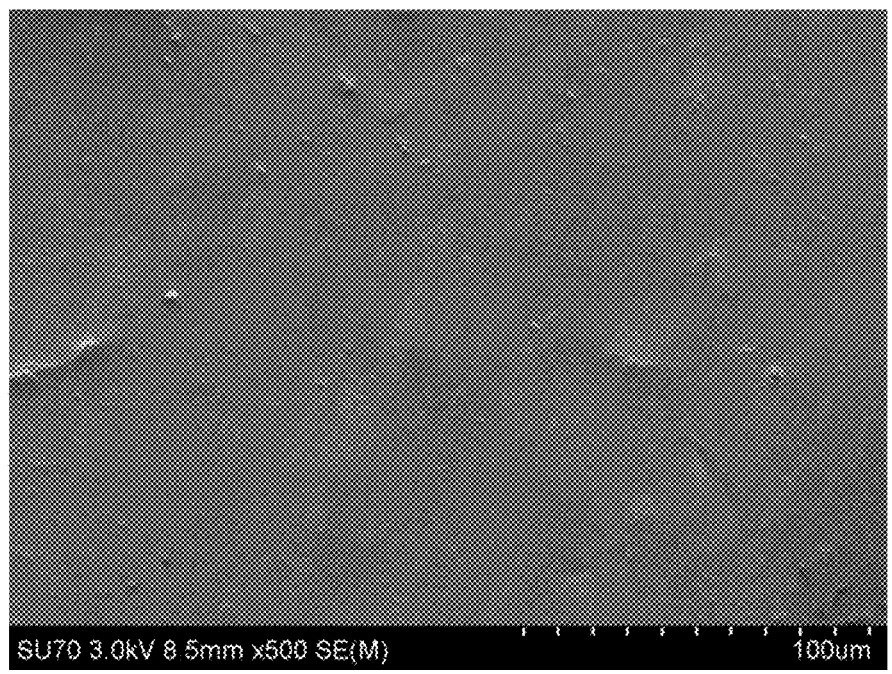
FIG. 2 is the SEM image of an alkaline anion exchange membrane non-doped with transition metal ions of comparative embodiment 1.

The SEM test was performed for embodiment 1 and comparative embodiment 1, and the differences between those two were compared. FIG. 1 is the SEM image of the alkaline anion exchange membrane doped with Co ions which was prepared in embodiment 1. FIG. 2 is the SEM image of the alkaline anion exchange membrane which was prepared in comparative embodiment 1. There were no obvious differences between FIG. 1 and FIG. 2, which indicated that transition metal ion Co was doped well into the organic molecular chain.

IV) XRD Test

Figure 3:
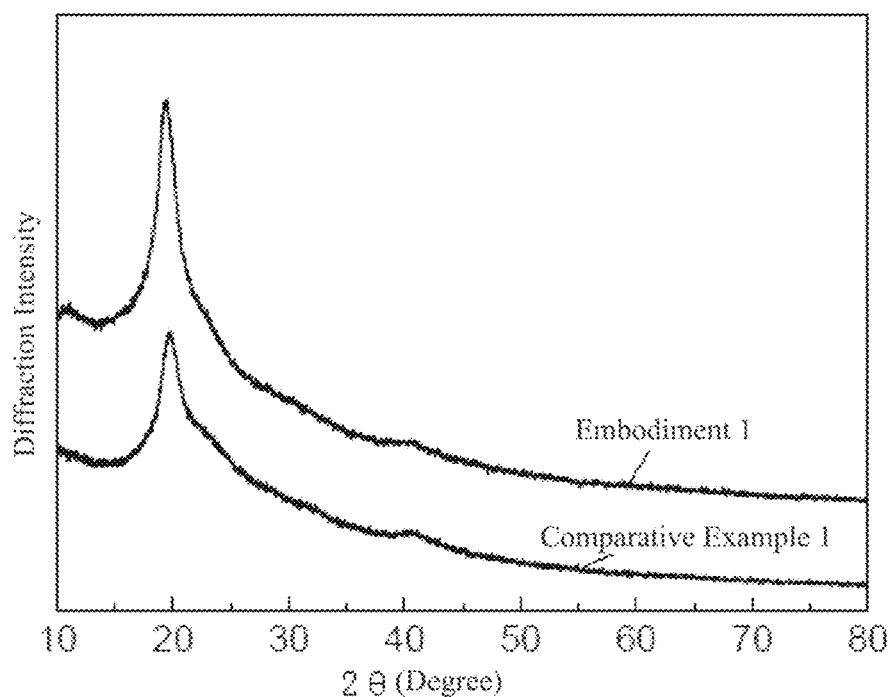
FIG. 3 is a XRD test pattern of the alkaline anion exchange membrane of embodiment 1 and comparative embodiment 1.

The X-Ray diffraction test was performed for embodiment 1 and comparative embodiment 1, as shown in FIG. 3. There were no obvious differences between embodiment 1 and comparative embodiment 1. A crystallization peak of Co didn't appear in the curves of embodiment 1. Thus it can be further judged that Co ions were doped into the organic molecular chain.

V) Electrochemistry Impedance Test

Figure 4:
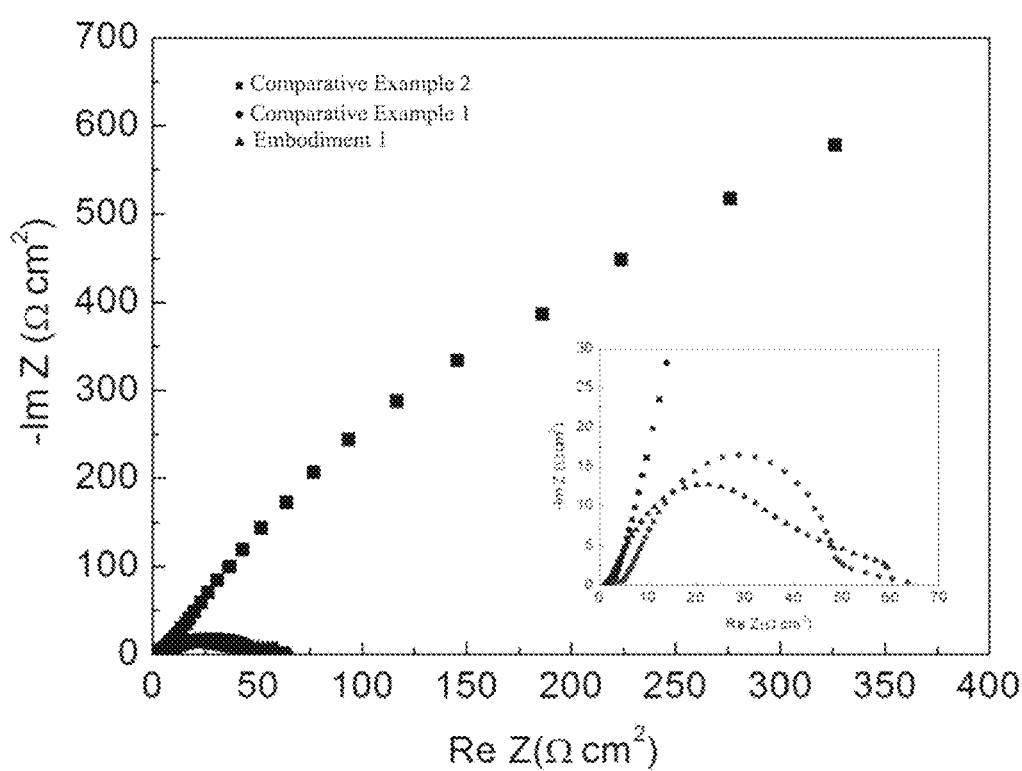
FIG. 4 is an EIS impedance test pattern of embodiment 1, comparative embodiment 1 and comparative embodiment 2, which are tested under an open circuit state.

The electrochemistry impedance test data can reflect well the ion conductivity rate of a reaction exchange membrane, reflecting the conductivity property. The electrochemistry impedance properties were tested respectively for each embodiment and each comparative embodiment. Curves of the impedance EIS under an open circuit of embodiment 1, comparative embodiment 1 and comparative embodiment 2 were shown in FIG. 4. It can be seen from FIG. 4 that an ohmic impedance of the alkaline anion exchange membrane doped with transition metal Co ions, which was prepared in embodiment 1, was the minimum. The ohmic impedance is shown as an intercept of the X-axis. And both of anode activation impedance and cathode activation impedance of the membrane of embodiment 1 were the minimum. The anode activation impedance was shown as a diameter of the first semicircle, and the cathode activation impedance was shown as a diameter of the second semicircle. It indicated that the conductivity of the alkaline anion exchange membrane doped with transition metal Co ions which was prepared in the present invention was better than the alkaline anion exchange membrane non-doped with transition metal ions, and meanwhile was better than the proton exchange membrane N117 produced by USA DuPont of the comparative embodiment 2, which was currently used in the market.

Figure 5:
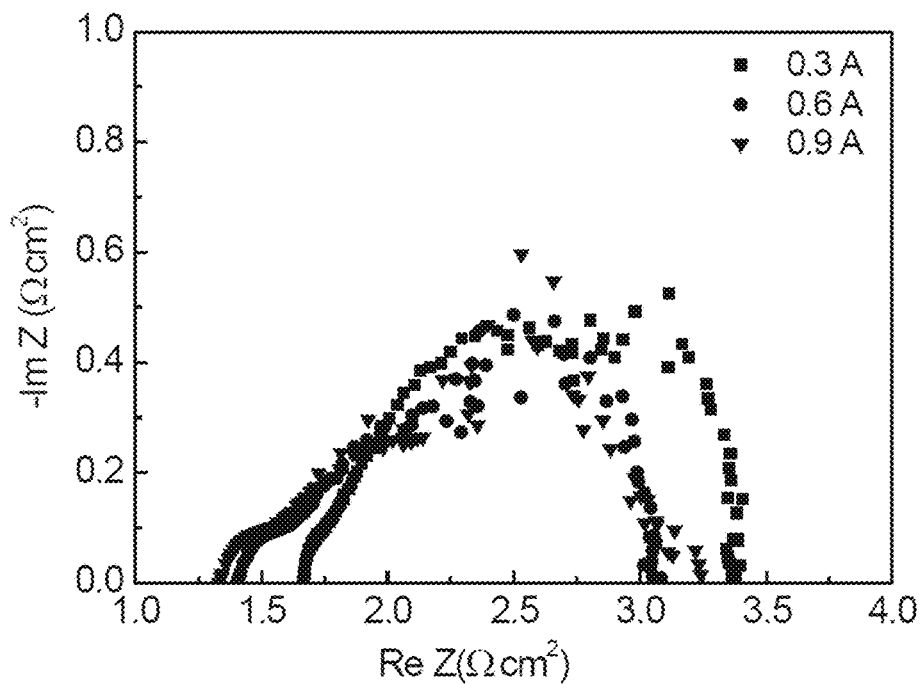
FIG. 5 is the EIS impedance test pattern of N117 membrane of comparative embodiment 2 under different discharging currents.
Figure 6:
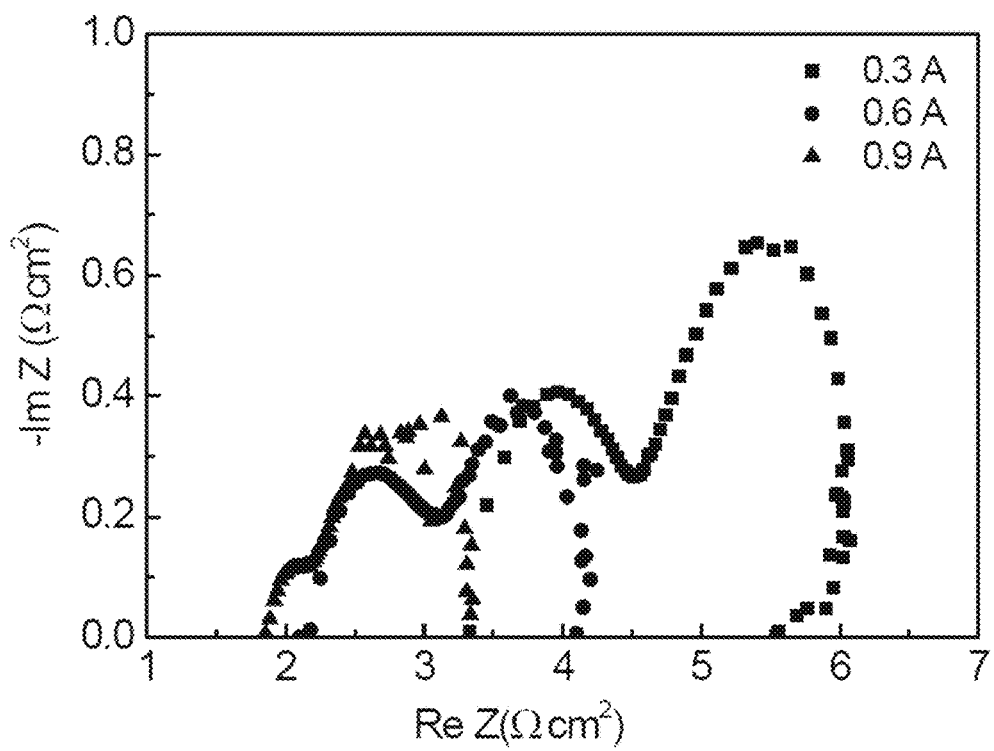
FIG. 6 is the EIS impedance test pattern of the alkaline anion exchange membrane of comparative embodiment 1 under different discharging currents.
Figure 7:
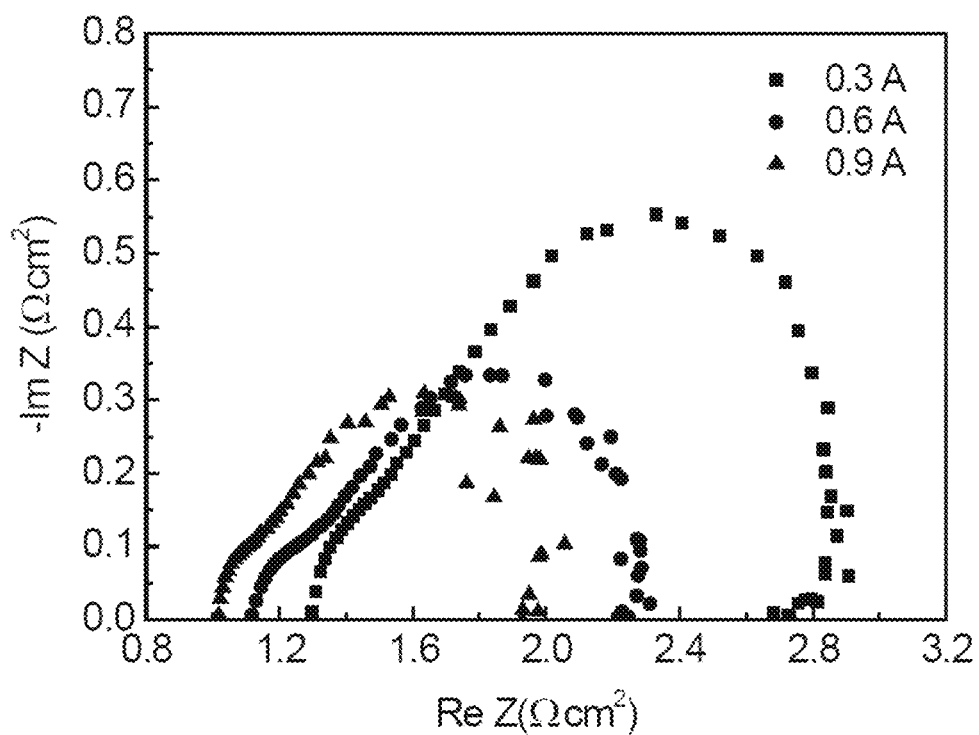
FIG. 7 is the EIS impedance test pattern of the alkaline anion exchange membrane of embodiment 1 under different discharging currents.

In addition, FIGS. 5-7 show respectively the EIS impedance of N117 membrane of comparative embodiment 2, the alkaline anion exchange membrane of comparative embodiment 1 and the alkaline anion exchange membrane of embodiment 1 under three different output currents of 0.3 A, 0.6 A and 0.9 A. It can be seen from the figures that all of the three show a phenomenon of decreased impedances as the output current increasing. But it can be seen from the data, in general, the alkaline anion exchange membrane doped with transition metal Co ions, which was prepared in embodiment 1, can efficiently decrease the ohmic impedance, the anode activation impedance and the cathode activation impedance of the fuel cell during the process of work, thereby decreases the conductivity of the fuel cell and achieves the object of improving the power-generating property of the cell.

VI) Property Test of the Fuel Cell

Figure 8:
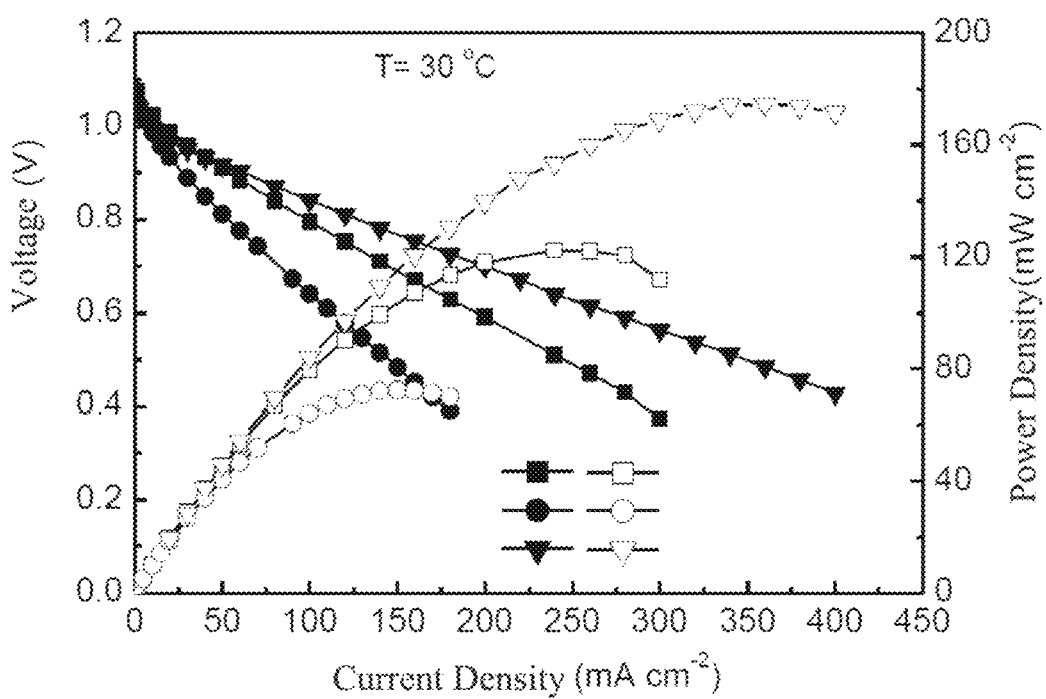
FIG. 8 is a graph of a power-generating property of monocells which are assembled by the exchange membranes of embodiment 1, comparative embodiment 1 and comparative embodiment 2 under 30 degrees centigrade.
Figure 9:
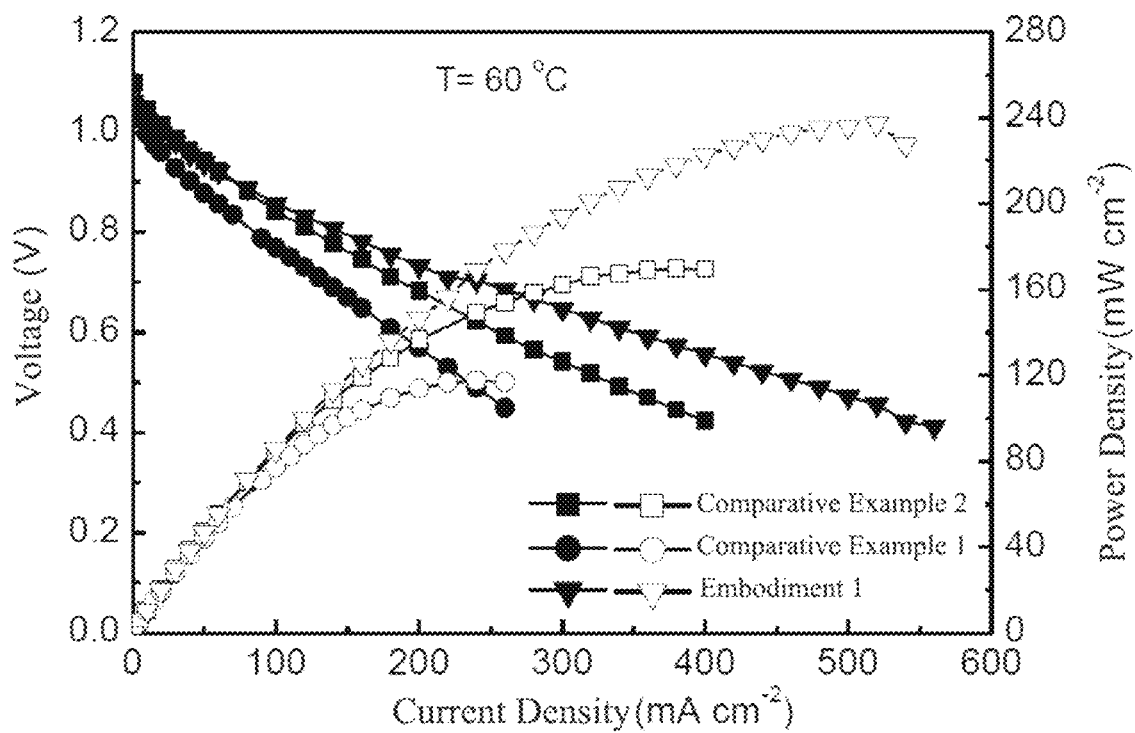
FIG. 9 is the graph of the power-generating property of the monocells which are assembled by the exchange membranes of embodiment 1, comparative embodiment 1 and comparative embodiment 2 under 60 degrees centigrade.
Figure 10:
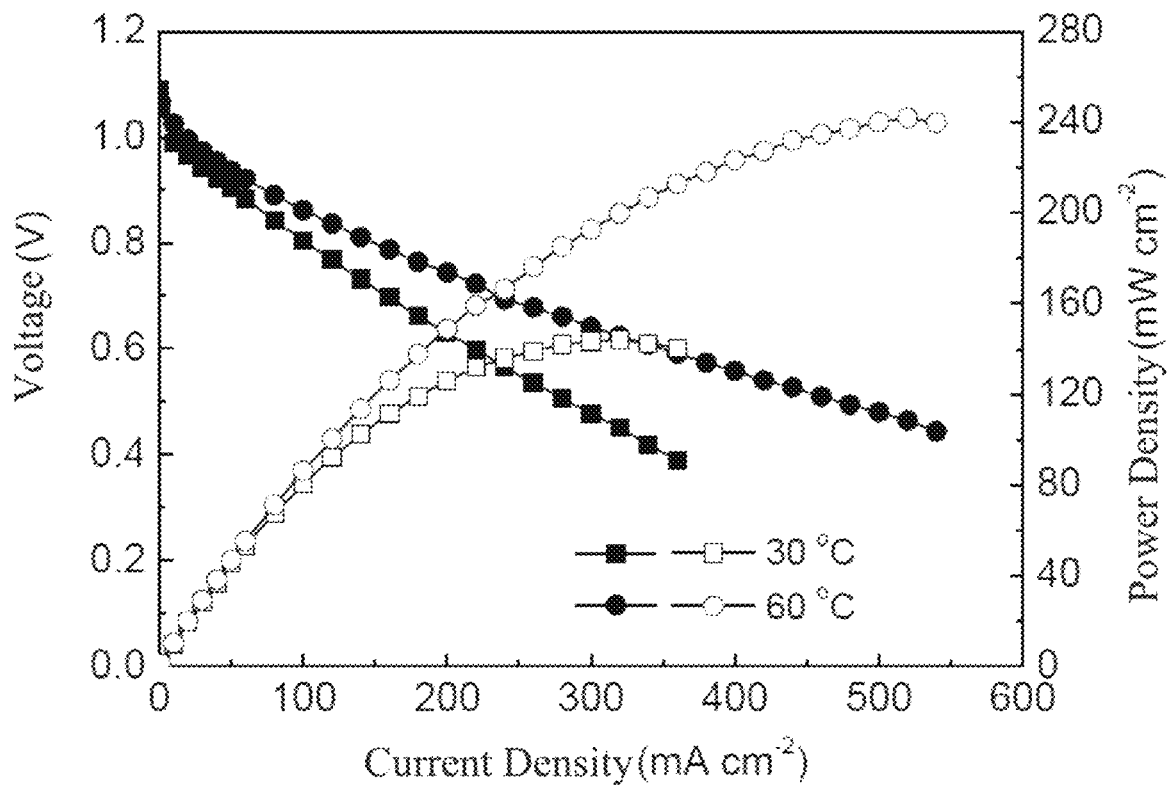
FIG. 10 is the graph of the power-generating property of the monocell which is assembled by using the alkaline anion exchange membrane doped with transition metal Co ions prepared in embodiment 2.

Fuel cells were assembled respectively by using the exchange membranes of embodiment 1, embodiment 2, comparative embodiment 1 and comparative embodiment 2, and by using sodium borohydride as a fuel. Graphs of power-generating curves of the assembled monocells under different temperatures were as shown in FIGS. 8-10. In particular, FIG. 8 was the graph of power-generating curves of the monocells assembled by the exchange membranes of embodiment 1, comparative embodiment 1 and comparative embodiment 2 under 30 degrees centigrade. FIG. 9 was the graph of power-generating curves of the monocells assembled by the exchange membranes of embodiment 1, comparative embodiment 1 and comparative embodiment 2 under 60 degrees centigrade. It can be seen from the figures that, under different temperatures, comparing with two comparative embodiments, the power-generating property of the alkaline anion exchange membrane doped with transition metal Co ions, which was prepared in embodiment 1, was the best. For the alkaline anion exchange membrane doped with transition metal Co ions which was prepared in embodiment 1, the maximum output power density was 174 mW·cm$^{-2}$ under 30° C., while the maximum output power density was 237 mW·cm$^{-2}$ under 60° C.

FIG. 10 was the graph of power-generating curves of the monocell assembled by the alkaline anion exchange membrane doped with transition metal Co ions which was prepared in embodiment 2. For the alkaline anion exchange membrane doped with transition metal Co ions which was prepared in embodiment 2, the maximum output power density was 144 mW·cm$^{-2}$ under 30° C., while the maximum output power density was 242 mW·cm$^{-2}$ under 60° C., which were equivalent to embodiment 1. It can be seen that all of the fuel cells using the alkaline anion exchange membrane doped with transition metal Co ions, showed an excellent power-generating property.

What is claimed:

1. A preparation method of an alkaline anion exchange membrane, containing the steps below:
   1) adding a transition metal inorganic salt into deionized water, stirring, to obtain an aqueous solution of transition metal inorganic salt;
   2) dissolving a polyvinyl alcohol powder into the aqueous solution of transition metal inorganic salt which is obtained in the step 1), heating and stirring, to obtain a first gel;
   3) grinding an AER alkaline resin into fine powders, adding the fine powders into the first gel, after a cross-linking reaction between fine powders and the first gel, forming a second gel;
   4) film-forming the second gel on a substrate, drying; and
   5) alkalization pretreating the dried film.

2. The preparation method of the alkaline anion exchange membrane according to claim 1, wherein the transition metal inorganic salt is selected from a group consisting an inorganic salt of transition metal Co, an inorganic salt of transition metal Fe and an inorganic salt of transition metal of transition metal Ni.

3. The preparation method of the alkaline anion exchange membrane according to claim 2, wherein the transition metal inorganic salt is a divalent cobalt salt.

4. The preparation method of the alkaline anion exchange membrane according to claim 3, wherein the divalent cobalt salt is cobalt dioxide or $CoSO_4$.

5. The preparation method of the alkaline anion exchange membrane according to claim 1, wherein the addition amount of the transition metal inorganic salt is determined in step 1) according to the content of transition metal ions, and the content of the transition metal ions is 0.1%-1%; the content of the transition metal ions is a mass percentage of the transition metal ions to polyvinyl alcohol.

6. The preparation method of the alkaline anion exchange membrane according to claim 1, wherein in step 2), a heating temperature is controlled to be between 80 and 95 degrees centigrade, and a solution is stirred for 2.5-3 h.

7. The preparation method of the alkaline anion exchange membrane according to claim 1, wherein a mass ratio of the AER alkaline resin added in step 3) to the polyvinyl alcohol powders added in step 2) is 1:2.

8. The preparation method of the alkaline anion exchange membrane according to claim 1, wherein the alkalization pretreatment contains immersing the film formed in step 4) into a solution of 1M KOH for 12-24 h, taking the film out and repeatedly washing the film by using deionized water.

* * * * *